(12) United States Patent
Cheung et al.

(10) Patent No.: US 10,422,856 B2
(45) Date of Patent: Sep. 24, 2019

(54) FREQUENCY NONLINEARITY CALIBRATION IN FREQUENCY-MODULATED CONTINUOUS WAVE RADAR

(71) Applicant: Futurewei Technologies, Inc., Plano, TX (US)

(72) Inventors: Ricky Lap Kei Cheung, San Diego, CA (US); Luzhou Xu, Santa Clara, CA (US); Lixi Wu, San Diego, CA (US); Hsing Kuo Lo, San Diego, CA (US); Yuan Su, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 288 days.

(21) Appl. No.: 15/493,737

(22) Filed: Apr. 21, 2017

(65) Prior Publication Data

US 2018/0329031 A1 Nov. 15, 2018

(51) Int. Cl.
*G01S 7/40* (2006.01)
*G01S 13/34* (2006.01)
(Continued)

(52) U.S. Cl.
CPC ............. *G01S 7/40* (2013.01); *G01S 7/352* (2013.01); *G01S 7/4021* (2013.01);
(Continued)

(58) Field of Classification Search
CPC ...... G01S 13/34; G01S 7/4021; G01S 13/758; G01S 7/352; G01S 7/40; G01S 2007/4065; G01S 7/285; G01S 7/4056
See application file for complete search history.

(56) References Cited

U.S. PATENT DOCUMENTS 5,469,167 A  11/1995  Polge et al.
6,198,416 B1 *  3/2001  Velazquez ........... H03M 1/0614
                                                                341/118
(Continued)

FOREIGN PATENT DOCUMENTS

CN  103078640 A  5/2013
CN  103454618 A  12/2013
(Continued)

OTHER PUBLICATIONS

"International Application Serial No. PCT/CN2018/084007, International Search Report dated Jun. 27, 2018", 4 pgs.
(Continued)

*Primary Examiner* — Olumide Ajibade Akonai
(74) *Attorney, Agent, or Firm* — Schwegman Lundberg & Woessner, P.A.

(57) ABSTRACT

Various embodiments include methods and systems having a frequency-modulated continuous wave radar operable to compensate a return signal for nonlinearity in the associated radar signal that is transmitted. The radar signal can be mixed with a delayed version of the radar signal such that the mixed signal can be used to generate an estimate of the nonlinearity. The estimate can be used to compensate the return signal from an object that reflects the associated transmitted radar signal. Additional apparatus, systems, and methods can be implemented in a variety of applications.

20 Claims, 10 Drawing Sheets

(51) Int. Cl.
*G01S 7/35* (2006.01)
*G01S 7/285* (2006.01)
*G01S 13/75* (2006.01)

(52) U.S. Cl.
CPC ............ *G01S 7/4056* (2013.01); *G01S 13/34* (2013.01); *G01S 7/285* (2013.01); *G01S 13/758* (2013.01); *G01S 2007/4065* (2013.01)

(56) References Cited

U.S. PATENT DOCUMENTS

| | | | |
|---|---|---|---|
| 7,202,812 | B2 | 4/2007 | Krikorian et al. |
| 9,503,112 | B1* | 11/2016 | Zanbaghi ............ H03M 1/1004 |
| 2009/0251361 | A1* | 10/2009 | Beasley ................ G01S 7/354 342/169 |
| 2011/0002428 | A1* | 1/2011 | Erickson ............... H03F 1/3223 375/350 |
| 2011/0095819 | A1 | 4/2011 | Velazquez |
| 2012/0306673 | A1* | 12/2012 | Ueno .................. H03M 1/0612 341/118 |
| 2014/0028491 | A1 | 1/2014 | Ferguson et al. |
| 2014/0313071 | A1 | 10/2014 | Mccorkle |
| 2015/0084811 | A1* | 3/2015 | Mazzaro ............... G01S 13/343 342/176 |
| 2017/0163356 | A1* | 6/2017 | Chen ..................... H04B 17/21 |

FOREIGN PATENT DOCUMENTS

| | | |
|---|---|---|
| EP | 2960672 A1 | 12/2015 |
| JP | 2005-181147 A | 7/2005 |

OTHER PUBLICATIONS

"International Application Serial No. PCT/CN2018/084007, Written Opinion dated Jun. 27, 2018", 4 pgs.

Kim, Choul-Young, et al., "Tx Leakage Cancellers for 24 HGz and 77 GHz Vehicular Radar Applications", *IEEE MTT-S International Microwave Symposium Digest*, (Jun. 2006), 1-4.

Lien, Jaime, et al., "Soli: Ubiquitous Gesture Sensing with Millimeter Wave Radar", *ACM Transactions on Graphics (TOG)*, vol. 35 Issue 4, Article 142, (Jul. 2016), 19 pgs.

Lin, Kaihui, et al., "A Digital Leakage Cancellation Scheme for Monostatic FMCW Radar", *IEEE MTT-S International Microwave Symposium Digest*, (Jun. 2004), 747-750.

Lin, Kaihui, et al., "A Ka-Band FMCW Radar Front-End With Adaptive Leakage Cancellation", *IEEE Transactions on Microwave Theory and Techniques*, 54(12), (Dec. 2006), 4041-4048.

Meinel, Holger H., et al., "Evolving Automotive Radar—from the very beginnings into the future", *The 8th European Conference on Antennas and Propagation (EuCAP2014)*, (2014), 3107-3114.

Melzer, Alexander, et al., "Short-Range Leakage Cancelation in FMCW Radar Transceiver Using an Artificial On-Chip Target", *IEEE Journal of Selected Topics in Signal Processing*, vol. 9, No. 8, (Dec. 2015), 1650-1660.

* cited by examiner

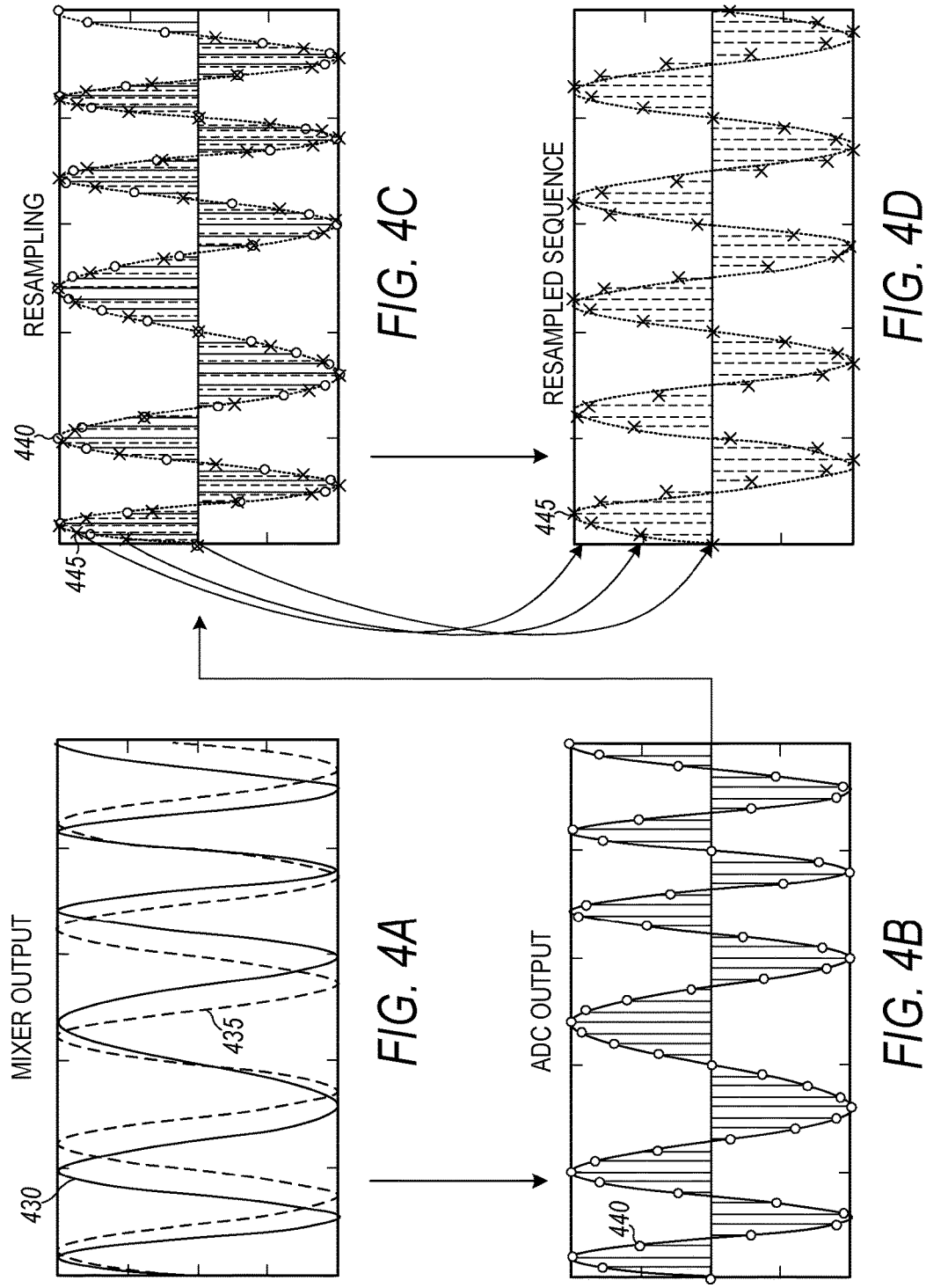

FREQUENCY NONLINEARITY CALIBRATION IN FREQUENCY-MODULATED CONTINUOUS WAVE RADAR

CROSS-REFERENCE TO RELATED APPLICATIONS

This application is related to co-pending, commonly assigned, U.S. patent application Ser. No. 15/493,751, entitled "LEAKAGE SIGNAL CANCELLATION," filed on Apr. 21, 2017, which is hereby incorporated by reference in its entirety.

FIELD OF THE INVENTION

The present disclosure is related to sensing technologies, in particular, to radar-based sensing technologies.

BACKGROUND

A radar system transmits a signal and receives its echo. By processing the echo signal, the radar system is able to detect objects, and to estimate the distances, velocities, and directions associated with the objects. Historically, a pulsed radar is used in military applications, where targets of interest are typically far away from the radar system. The pulsed radar emits short pulses, and in the silent period receives the echo signals. The transmitter of the pulsed radar system is turned off before the measurement starts. However, in many civilian applications, such as automotive radar, wireless gesture recognition, vital sign monitoring, and other monitoring implementations, the objects of interest are usually close to the radar. Due to the short round-trip-delay (RTD) of the desired reflection signal, a pulsed radar doesn't work as well at close range. Instead of a pulsed radar, a frequency-modulated continuous wave or waveform (FMCW) radar is used for short distances.

In FMCW radar, the transmission signal is modulated in frequency (or in phase) and differences in phase or frequency between the transmitted signal and a received signal are used to measure distance to the object from which the transmitted signal is reflected. A linear frequency modulated (LFM) waveform can be used, whose instantaneous frequency linearly increases or decreases over time. With the change in frequency being linear over a wide range, then the distance can be determined by a frequency comparison, with the frequency difference being proportional to the distance. However, in practice, nonlinearity exists in the frequency sweep of the transmitted waveform. This can result in severe performance degradation.

SUMMARY

A frequency-modulated continuous wave radar system based on transmitting a radar signal having a linear instantaneous frequency includes a mechanism to estimate and compensate for a nonlinearity in the linear instantaneous frequency introduced by the waveform generator of the radar signal. Though the waveform generator is designed and constructed to operate to provide a linear sweep of frequency, such a waveform generator does not generate a perfectly ideal waveform. There is a difference in phase between the waveform generated as a radar signal to be transmitted from an antenna and an ideal waveform corresponding to the desired radar signal. This difference in phase translates to a nonlinearity in the desired linear instantaneous frequency for the generated radar signal. Determination of an estimate of this nonlinearity allows for the adjustment of a return radar signal to approach that corresponding to the ideal waveform in the processing of the return radar signal. The return signal, which corresponds to the transmitted radar signal, received at a receiver antenna is mixed with the generated radar signal from the waveform generator to provide an output signal, which is converted to a first digital signal. A delay generator is coupled to the waveform generator to receive the radar signal that is directed to the transmitter antenna of the frequency-modulated continuous wave radar system and to provide a delayed radar signal. The delayed radar signal is mixed with the generated radar signal from the waveform generator to provide an output signal, which is converted to a second digital signal. The second digital signal is processed to generate an estimate of the nonlinearity introduced to the radar signal at the waveform generator. The estimate is used to compensate the first digital signal to provide a compensated digital signal that can be used to perform functions associated with detection of an object.

Various examples are now described to introduce a selection of concepts in a simplified form that are further described below in the detailed description. The Summary is not intended to identify key or essential features of the claimed subject matter, nor is it intended to be used to limit the scope of the claimed subject matter.

According to one aspect of the present disclosure, a system having a frequency-modulated continuous wave radar, the system comprising: a waveform generator to generate a radar signal having an instantaneous frequency, the instantaneous frequency being linear plus a nonlinearity; a transmitting antenna to transmit the radar signal; a receiving antenna to receive a return signal from an object that reflects the transmitted radar signal; a first mixer to mix the radar signal with the return signal and to output a first mixer output signal; a first analog-to-digital converter to convert the first mixer output signal to a first digital mixer output signal; a delay generator coupled to the waveform generator to generate a delayed radar signal; a second mixer to mix the radar signal with the delayed radar signal and to output a second mixer output signal; a second analog-to-digital converter to convert the second mixer output signal to a second digital mixer output signal; and circuitry to generate an estimate of the nonlinearity based on the second digital mixer output signal and to compensate the first digital mixer output signal by use of the estimate.

Optionally, in any of the preceding aspects, another implementation of the aspect provides that the circuitry is arranged to generate the estimate as a function of time based on phase of the second digital mixer output signal, center frequency of the radar signal, chirp rate of the radar signal, and delay of the delayed radar signal.

Optionally, in any of the preceding aspects, a further implementation of the aspect provides that the circuitry is arranged to record the first digital mixer output signal and to resample the first digital mixer output signal at an adjusted time using the estimate.

Optionally, in any of the preceding aspects, a further implementation of the aspect provides that the circuitry to resample includes an interpolation of the first digital mixer output signal at sampled times immediately before and immediately after the adjusted time.

Optionally, in any of the preceding aspects, a further implementation of the aspect provides that a delay of the delay generator to generate a delayed radar signal is in the range from 100 picoseconds to 10 nanoseconds.

Optionally, in any of the preceding aspects, a further implementation of the aspect provides that the system includes a first low pass filter coupling the first mixer to the first analog-to-digital converter and a second low pass filter coupling the second mixer to the second analog-to-digital converter.

According to one aspect of the present disclosure, there is provided a system having a frequency-modulated continuous wave radar, the system comprising: a waveform generator to generate a radar signal having an instantaneous frequency, the instantaneous frequency being linear plus a nonlinearity; a transmitting antenna to transmit the radar signal; a receiving antenna to receive a return signal from an object that reflects the transmitted radar signal; a delay generator coupled to the waveform generator to generate a delayed radar signal; a mixer coupled to the waveform generator to receive the radar signal; a switch having an input coupled to the delay generator, an input coupled to a path to the receiving antenna, and an output coupled to the mixer such that with the switch operatively coupling the receiving antenna to the mixer, an output of the mixer provides a first mixer output signal from mixing the radar signal with the return signal, and with the switch operatively coupling the delay generator to the mixer, an output of the mixer provides a second mixer output signal from mixing the radar signal with the delayed radar signal; an analog-to-digital converter coupled to the mixer to convert the first mixer output signal to a first digital mixer output signal and to convert the second mixer output signal to a second digital mixer output signal; and circuitry to generate an estimate of the nonlinearity based on the second digital mixer output signal and to compensate the first digital mixer output signal by use of the estimate.

Optionally, in any of the preceding aspects, another implementation of the aspect provides that the circuitry is arranged to generate the estimate as a function of time based on phase of the second digital mixer output signal, center frequency of the radar signal, chirp rate of the radar signal, and delay of the delayed radar signal.

Optionally, in any of the preceding aspects, a further implementation of the aspect provides that the circuitry is arranged to record the first digital mixer output signal and to resample the first digital mixer output signal at an adjusted time using the estimate.

Optionally, in any of the preceding aspects, a further implementation of the aspect provides that the circuitry to resample includes an interpolation of the first digital mixer output signal at sampled times immediately before and immediately after the adjusted time.

Optionally, in any of the preceding aspects, a further implementation of the aspect provides that a delay of the delay generator to generate a delayed radar signal is in the range from 100 picoseconds to 10 nanoseconds.

Optionally, in any of the preceding aspects, a further implementation of the aspect provides that the system includes a low pass filter coupling the mixer to the analog-to-digital converter.

According to one aspect of the present disclosure, there is provided a method of operating a frequency-modulated continuous wave radar, the method comprising: generating, using a waveform generator, a radar signal having an instantaneous frequency, the instantaneous frequency being linear plus a nonlinearity; transmitting the radar signal from a transmitting antenna; receiving, at a receiving antenna, a return signal from an object that reflects the transmitted radar signal; mixing the radar signal with the return signal and outputting a first mixer output signal; converting the first mixer output signal to a first digital mixer output signal; generating, using a delay generator, a delayed radar signal from the radar signal; mixing the radar signal with the delayed radar signal and outputting a second mixer output signal; converting the second mixer output signal to a second digital mixer output signal; and generating an estimate of the nonlinearity based on the second digital mixer output signal and compensating the first digital mixer output signal by use of the estimate.

Optionally, in any of the preceding aspects, another implementation of the aspect provides that generating the estimate of the nonlinearity includes estimating the nonlinearity as a function of time based on phase of the second digital mixer output signal, center frequency of the radar signal, chirp rate of the radar signal, and delay of the delayed radar signal.

Optionally, in any of the preceding aspects, a further implementation of the aspect provides that compensating the first digital mixer output signal includes recording the first digital mixer output signal and resampling the first digital mixer output signal at an adjusted time using the estimate.

Optionally, in any of the preceding aspects, a further implementation of the aspect provides that resampling the first digital mixer output signal includes an interpolating the first digital mixer output signal at sampled times immediately before and immediately after the adjusted time.

Optionally, in any of the preceding aspects, a further implementation of the aspect provides that the method includes operating a switch with a mixer that provides the first mixer output signal and the second mixer output signal in a calibration mode or in a compensation mode such that the calibration mode is executed with the switch operatively coupling the delay generator to the mixer, and the compensation mode is executed with the switch operatively coupling the mixer to the receiving antenna.

Optionally, in any of the preceding aspects, a further implementation of the aspect provides that the method includes applying a fast Fourier transform to compensated first digital mixer output signal to detect the object and to estimate a delay associated with transmitting the radar signal and receiving the return signal.

Optionally, in any of the preceding aspects, a further implementation of the aspect provides that the method includes using the compensated first digital mixer output signal to determining one or more from a set including distance, velocity, and direction associated with the object.

Optionally, in any of the preceding aspects, a further implementation of the aspect provides that the method includes operating the frequency-modulated continuous wave radar in an automobile or a terminal device.

BRIEF DESCRIPTION OF THE DRAWINGS

FIGS. 4A-4D illustrate sequencing of the compensation of a received signal associated with FIGS. 3A-3B from mixer output to a resampled sequence, according to an example embodiment.

DETAILED DESCRIPTION

Figure 1:
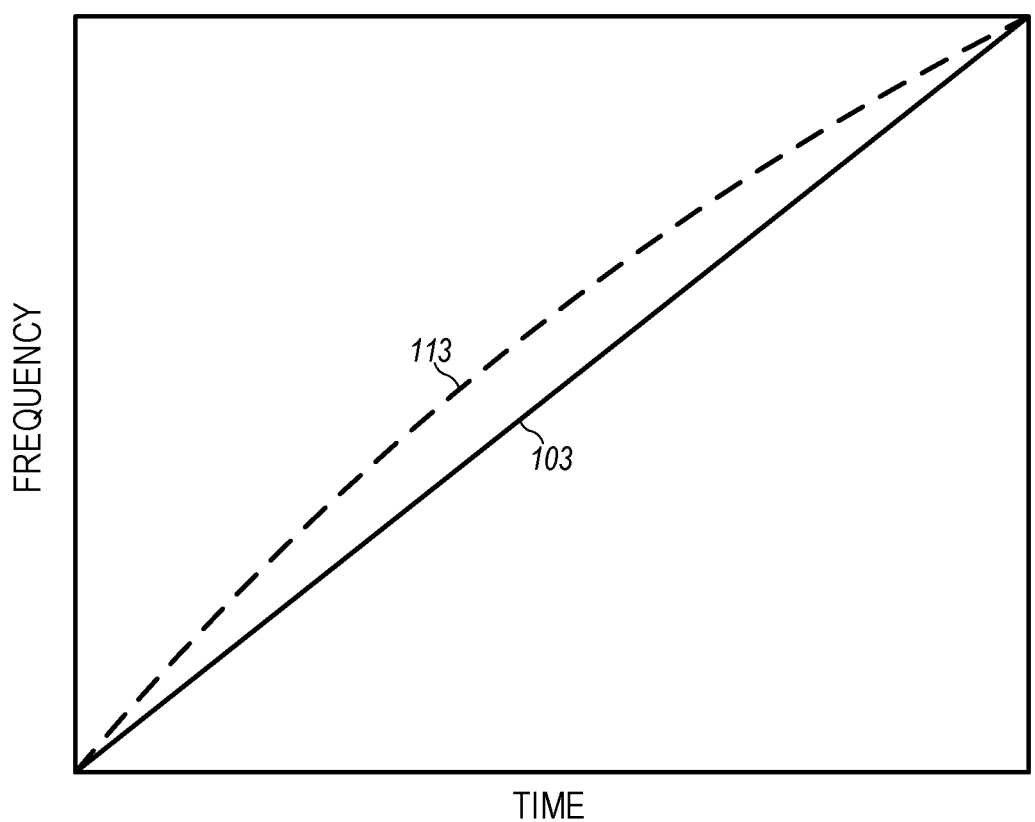
FIG. 1 is a comparison of an ideal frequency over time relationship for a transmitted waveform compared with a frequency over time relationship in a non-ideal system, according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in an embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, an application specific integrated circuit (ASIC), microprocessor, or other type of processor operating on a processing system, such as but not limited to a computer system, such as a personal signal processing device, personal computer, server, or other computer system, turning such processing system into a specifically programmed machine.

In various embodiments, an online calibration is provided to estimate and compensate frequency sweep nonlinearity in FMCW radar. Calibration is online in that the components for measurement, estimation, and compensation can be integrated with systems including the FMCW radar. Such systems can include, but are not limited to, applications for automotive radar, radar-based gesture recognition and vital sign monitoring used in smart watch and other wearable devices.

In various embodiments, a delay line (DL) technique can be used to estimate frequency sweep nonlinearity. Such techniques can include mixing a waveform that is being transmitted with a delayed version of the waveform, and estimating nonlinearity, associated with a received signal from reflection of the transmitted waveform, via processing the signal at a mixer output from mixing the waveform being transmitted and its delayed version. The delayed version of the waveform may include a delay in the range from 100 picoseconds to 10 nanoseconds or other ranges. Processing this mixed signal provides a calibration method that provides an estimate to compensate the nonlinearity in the received signal to the radar system. This approach has lower computational complexity and can deal with larger nonlinearity than conventional approaches, especially for short-range radar systems, for example, automotive radar, gesture recognition, vital side monitoring, and other monitoring systems.

An ideal waveform for transmission in an FMCW radar can be taken to be a signal, s(t):

$$s(t)=e^{j2\pi(f_c t+0.5\gamma t^2)}, \quad (1)$$

with $f_c$ and $\gamma$ being the center frequency for the waveform and the chirp rate. A chirp, which can be referred to as a sweep signal, is a signal in which the frequency increases or decreases with time. The chirp rate is the rate of change in the chirp. The instantaneous frequency for s(t) is given as $f_c+\gamma t$, linearly increasing over time t.

The received signal, as a reflected signal from an object to which the transmitted signal is incident, can be modeled as x(t):

$$x(t)=\beta s(t-\tau)=\beta e^{j2\pi(f_c(t-\tau)+0.5\gamma(t-\tau)^2)}, \quad (2)$$

with $\beta$ and $\tau$ being amplitude and delay, respectively. The signals s(t) and x(t) can be combined at a mixer having output, y(t):

$$y(t)=x^*(t)s(t)=\beta e^{j2\pi(f_c\tau-0.5\gamma\tau^2)}e^{j2\pi\gamma t\tau}, \quad (3)$$

which is a sinusoid over t, where x*(t) is the complex conjugate of x*(t). From applying a fast Fourier transform (FFT) to y(t), objects can be detected, and the associated delay $\tau$ can be estimated.

However, in practical systems, the frequency is not linear. FIG. 1 is a comparison of an ideal frequency over time relationship for a transmitted waveform in curve 103 compared with a frequency over time relationship, in a non-ideal system, in curve 113. A non-ideal waveform transmitted in an FMCW radar, corresponding to the ideal waveform, can be taken to be:

$$s(t)=e^{j2\pi(f_c t+0.5\gamma t^2+\varepsilon(t))}, \quad (4)$$

where $\varepsilon(t)$ is a difference in phase between the waveform generated as the radar signal to be transmitted from an antenna and a ideal waveform corresponding to the radar signal, which $\varepsilon(t)$ may be referred to as a denoting a phase error. The instantaneous frequency for s(t) is now given as $f_c+\gamma t+\varepsilon'(t)$, which is not perfectly linear. The term, $\varepsilon'(t)$, is the time derivative of $\varepsilon(t)$ and is a nonlinearity added to the linear instantaneous frequency, where this nonlinearity is an unwanted artifact from generation of the radar signal.

The received signal, as a reflected signal from an object to which the transmitted signal is incident, for the non-ideal case, can now be modeled as:

$$y(t)\beta s(t-\tau)=\beta e^{j2\pi(f_c(t-\tau)+0.5\gamma(t-\tau)^2+\varepsilon(t-\tau))}. \quad (5)$$

The signals s(t) and x(t) combined at the mixer have output, y(t):

$$y(t)=x^*(t)s(t)=\beta e^{j2\pi(f_c\tau-0.5\gamma\tau^2)}e^{j2\pi(\gamma\tau\tau+\varepsilon(t)-\varepsilon(t-\tau))}, \quad (6)$$

which is not a perfect sinusoid over t. Applying a fast Fourier transform (FFT) to y(t) of the non-ideal case without calibration yields performance degradation.

Figure 2:
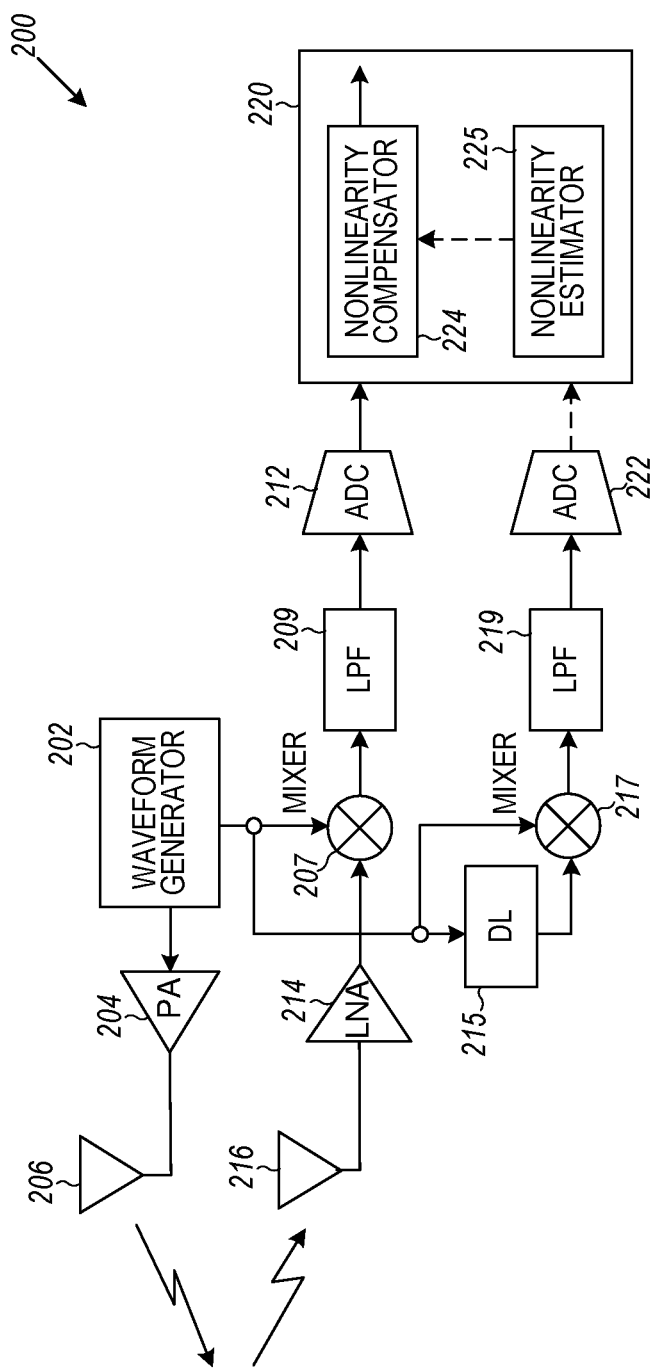
FIG. 2 is a block diagram of an example system including a frequency-modulated continuous wave radar, according to an example embodiment.

FIG. 2 is a block diagram of an embodiment of an example system 200 including a FMCW radar. System 200 includes a waveform generator 202 to generate a radar signal for transmission, a transmitting antenna 206 to transmit the radar signal, a receiving antenna 216 to receive a return signal that is a reflection of the transmitted radar signal from an object, which can be viewed as an echo of the transmitted signal. Waveform generator 202 can be implemented using a voltage controlled oscillator (VCO). The radar signal from waveform generator 202 can be a processed signal for transmission by transmitting antenna 206. In typical implementations, the radar signal from waveform generator 202 can be operated on by a power amplifier (PA) 204 to provide a processed radar signal to transmitting antenna 206. In a similar situation, the received return signal can be a processed return signal. In typical implementations, the return signal form receiving antenna 216 can be operated on by a low noise amplifier 214 to provide a processed return signal.

System 200 can include a mixer 207 having an input coupled to waveform generator 202 to receive the radar signal that is generated for transmission and an input coupled to a path to the receiving antenna 216. Mixer 207 includes an output to provide a primary mixed signal that can be processed to determine distances, velocities, and directions associated with objects. Prior to processing to determine distances, velocities, and directions associated with the objects, the primary mixed signal can be applied to an analog-to-digital converter 212. Analog-to-digital converter (ADC) 212 can be coupled to mixer 207 by a low pass filter (LPF) 209 such that the primary mixed signal is filtered, according to the settings of the LPF 209, and provided to ADC 212.

The output of ADC 212 can be coupled to a processing module 220 to compensate the received return signal after processing by mixer 207, LPF 209, and ADC 212. Processing module 220 can include circuitry for a nonlinearity compensator 224 to compensate the processed received signal and a nonlinearity estimator 225 that provides an input to nonlinearity compensator 224. For example, after generating an estimate of ε'(t), nonlinearity estimator 225 can provide the estimate of ε'(t) to nonlinearity compensator 224. Nonlinearity compensator 224 can operate on the signal that is output from ADC 212 using the estimate of ε'(t). For the data signals {y [n]} from ADC 212, nonlinearity compensator 224 can generate a new set of data signals {y[n]}, where each value of the new set at n is equal to a value for the output from ADC 212 at a time shifted based on ε'(t). Nonlinearity compensator 224 and nonlinearity estimator 225 of processing module 220 can be implemented in an ASIC. Such an ASIC may include a processor with a limited instruction set. Processing module 220 can include data storage to hold signal data being processed. Depending on the architecture of system 200, processing module 220 may be realized with one or more processors and one or more data storage devices to store instructions and hold signal data being processed.

System 200 also includes a delay generator 215 coupled to waveform generator 202 to provide a delayed radar signal. The delayed radar signal can be provided as the generated radar signal, from waveform generator 202 to be transmitted, delayed by a delay of the delay generator 215. The delay can be in the range from 100 picoseconds to 10 nanoseconds. Other delay values may be used. Delay generator 215 is coupled to an input of a mixer 217, which also has an input coupled to waveform generator 202 to receive the generated radar signal from waveform generator 202. Mixer 217 has an output to provide a mixer output signal that provides a basis for using the circuitry of processing module 220 to estimate a nonlinearity in the instantaneous frequency of the radar signal to compensate a received return signal received at the receiving antenna from an object that reflects the transmitted radar signal. Processing module 220 can be coupled to mixer 217 by a LPF 219 and an ADC 222. ADC 222 can be arranged with LPF 219 to process the mixer output signal into a digital signal to be processed by processing module 220.

Figure 3A:
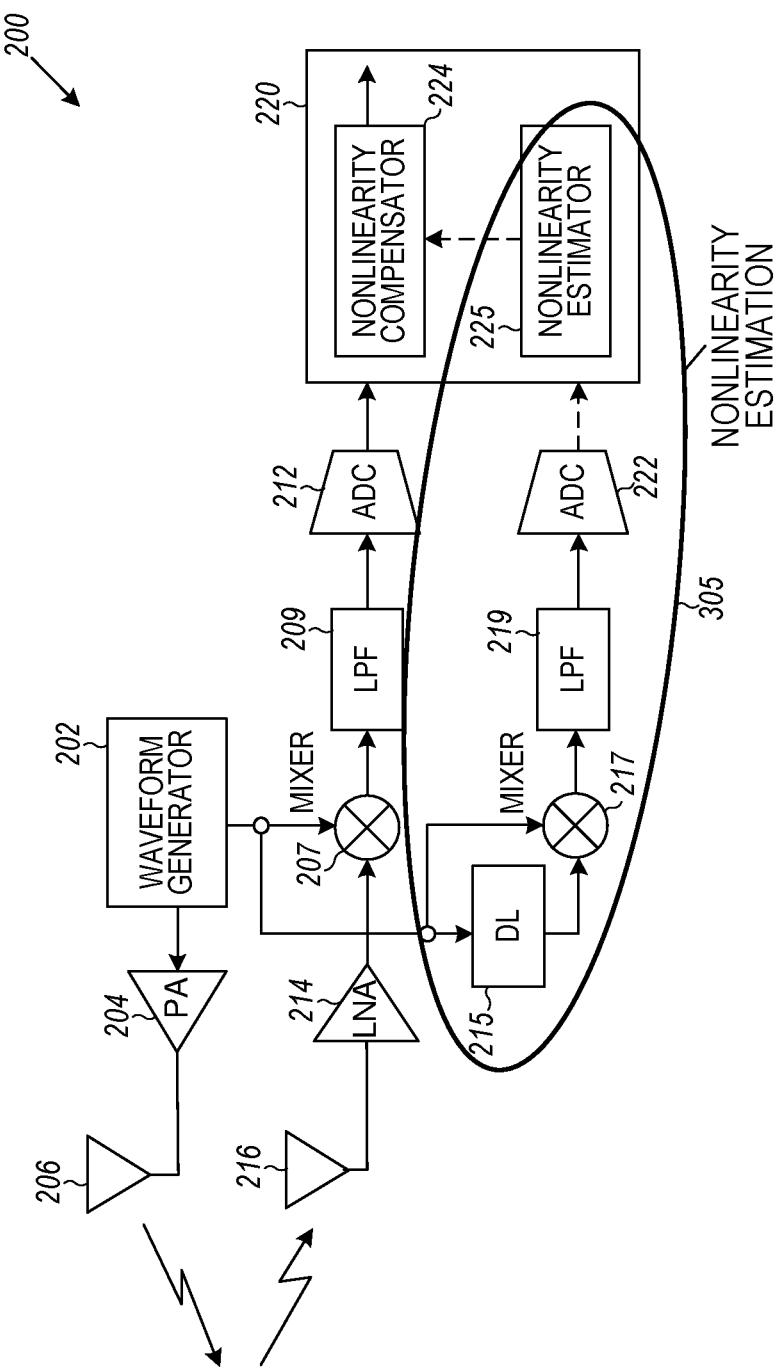
FIG. 3A illustrates an example nonlinearity estimation section of the example system of FIG. 2, according to an example embodiment.

System 200 can be viewed as having two parts: a nonlinearity estimation section and a nonlinearity compensation section. FIG. 3A shows an embodiment of a nonlinearity estimation section 305 of example system 200 of FIG. 2. In nonlinearity estimation section 305 is delay generator 215, mixer 217, LPF 219, ADC 222, and nonlinearity estimator 225 of processing module 220. In operation, a radar signal generated by waveform generator 202, where the radar signal is being transmitted, is also provided to DL 215. The generated radar signal can have an instantaneous frequency, where the instantaneous frequency is linear plus an unwanted and unknown nonlinearity, and has a center frequency and a chirp rate. DL 215 operatively imparts a delay to the radar signal to generate the delayed radar signal. The delay imparted by the delay generator to generate a delayed radar signal can be in the range from 100 picoseconds to 10 nanoseconds. Other delay values may be used. DL 215 can be implemented using a conventional delay generator. Examples of delay generator include an arrangement of an appropriate length of coax cable, inductor-capacitor delay lines, resistor-capacitor circuits, or other delay circuit in an integrated circuit. The delay generator may be a variable delay generator that can select amounts of delay to apply different delays. Testing can be conducted to determine the appropriate amount of delay to impart to the generated signal.

The generated radar signal and the generated delay radar signal is provided to mixer 217 to mix the generated radar signal with the delayed radar signal and to provide a mixer output signal, which can be given by $$y_{DL}(t) = e^{j2\pi(f_c\tau_{DL}-0.5\gamma\tau_{DL}^2)}e^{j2\pi(\gamma\tau\tau_{DL}+\varepsilon(t)-\varepsilon(t-\tau_{DL}))} \quad (7)$$

$$\approx e^{j2\pi(f_c\tau_{DL}-0.5\gamma\tau_{DL}^2)}e^{j2\pi(\gamma\tau\tau_{DL}+\varepsilon'(t)\tau_{DL})}$$

where $\tau_{DL}$ is the known small delay of DL 215, and ε'(t) is the time derivative of ε(t), where ε(t) is referred to as a phase error, herein. The mixer output signal $y_{DL}(t)$ can be applied to LPF 219, whose output is provided to ADC 222. The output of ADC 222 is provided to nonlinearity estimator 225 of processing module 220.

The circuitry of nonlinearity estimator 225 of processing module 220, can estimate a derivative of a phase error of the generated radar signal based on the mixer output signal to compensate a received signal received at the receiving antenna from an object that reflects the transmitted processed signal. That is, the circuitry of nonlinearity estimator 225 can generate an estimate of the nonlinearity of the instantaneous frequency based on the digital mixer output signal from ADC 222. Nonlinearity compensator 224 can be arranged to estimate the derivative of the phase error, which is the nonlinearity of the instantaneous frequency, as a function of time based on phase of the mixer output signal, the center frequency, the chirp rate, and the delay. From the above equation, ε'(t) can be estimated as $$\varepsilon'(t) = \frac{1}{2\pi\tau_{DL}}[\text{angle}(y_{DL}(t)) - 2\pi(f_c\tau_{DL} - 0.5\gamma\tau_{DL}^2 + \gamma t\tau_{DL})], \quad (8)$$

where the angle ($y_{DL}$(t)) is the phase of the mixer output signal $y_{DL}$(t). The estimated derivative can be provided to nonlinearity compensator 224 of processing module 220 to compensate the received return signal received at the receiving antenna from an object that reflects the transmitted processed signal. The output of ADC 222 and the estimated derivative can be stored in processing module 220 according to the discrete times of the ADC 222 for processing by the nonlinearity compensator 224. Nonlinearity estimation section 305 may be structured as an independent unit that can be coupled to a FMCW radar system.

Figure 3B:
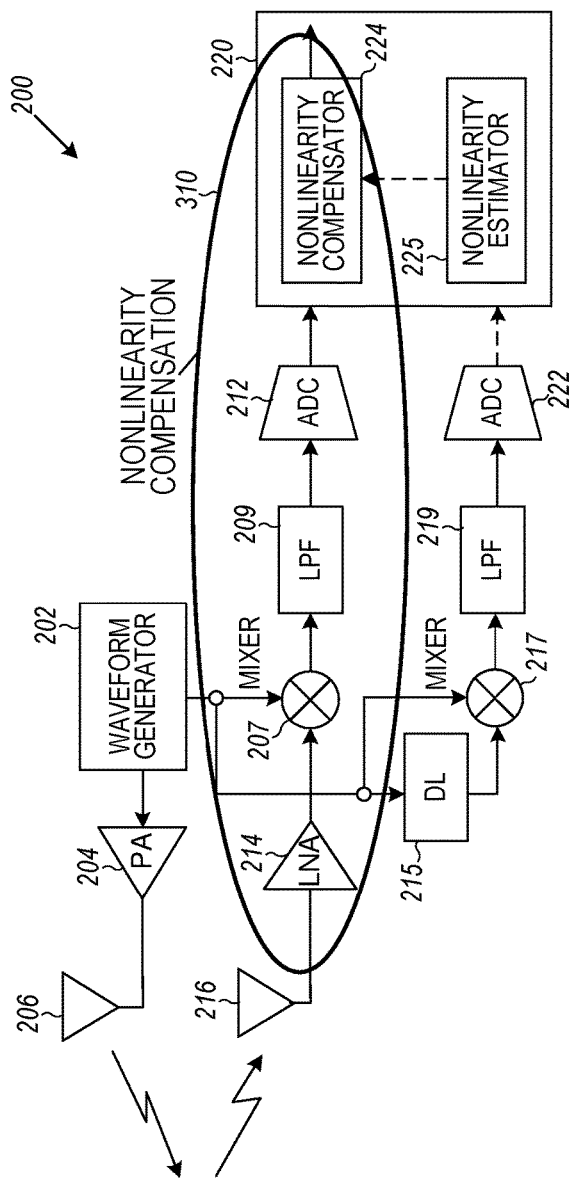
FIG. 3B illustrates an example nonlinearity compensation section of example the system of FIG. 2, according to an example embodiment.

FIG. 3B shows an embodiment of a nonlinearity compensation section 310 of example system 200 of FIG. 2. Nonlinearity compensation section 310 can include components of what may be termed a conventional FMCW radar. For example, a conventional FMCW radar may include components similar to LNA 214, mixer 207, LPF 209, and ADC 212. Nonlinearity compensation section 310 provides a novel mechanism to compensate for nonlinearity introduced into the generated radar signal from waveform generator 202. The circuitry of nonlinearity compensation section 310 of processing module 220 can apply the estimated nonlinearity (estimated derivative of the phase error) to compensate the processed received return signal. The received return signal from the receiving antenna can be operated on by LNA 214 and processed by mixer 207. Mixer 207 can be arranged in system 200 to mix the generated radar signal from waveform 202 with a form of the return signal received from the object that reflects the transmitted radar signal to provide a primary mixed signal. The form of the return signal may be the return signal received by receiving antenna 216. Typically the form of the return signal input to mixer 207 is from processing by LNA 214. ADC 212 is arranged in system 200 to process the primary mixed signal into a digital received signal as a processed return signal.

In a short-range radar, the delay τ associated the transmission of a generated signal and the reception of its reflection from an object is small. Hence, the primary mixed signal at the output of mixer 207 can be given as $$y(t) = \beta e^{j2\pi(f_c\tau - 0.5\gamma\tau^2)} e^{j2\pi(\gamma t\tau + \varepsilon(t) - \varepsilon(t-\tau))} \quad (9)$$

$$\approx \beta e^{j2\pi(f_c\tau - 0.5\gamma\tau^2)} e^{j2\pi\gamma\tau\left[t + \frac{\varepsilon'(t)}{\gamma}\right]}.$$

The primary mixed signal can be processed by LPF 209 prior to conversion to a digital signal by ADC 212, where output of the ADC 212 provides the digital return signal to the processing module 220. The circuitry of nonlinearity compensator 224 of processing module 220 can be arranged to operate on the digital return signal to compensate the digital return signal by a resampling based on the estimated nonlinearity, provided by nonlinearity estimator 225.

Figure 3C:
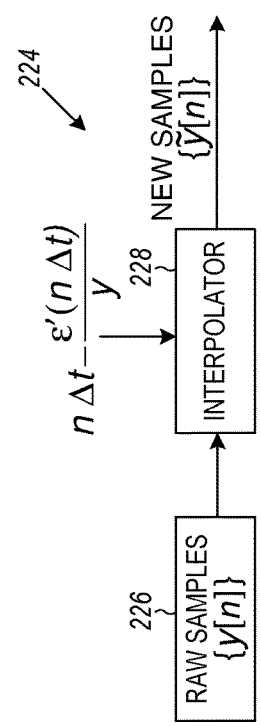
FIG. 3C is a block diagram of an example resampling implementation in a nonlinearity compensator such as the nonlinearity compensator of FIGS. 2, 3A, and 3B, according to an example embodiment.

FIG. 3C is a block diagram of an embodiment of an example resampling implementation in a nonlinearity compensator such as nonlinearity compensator 224 of FIGS. 2, 3A, and 3B. In an example resampling procedure, consider original samples, as a set of raw samples {y[n]}, which can be received at nonlinearity compensator 224 from ADC 212, and may be recorded in data storage 226 in nonlinearity compensator 224 or other section of processing module 220. The original samples are given by $$y[n] = y(n\Delta t). \quad (10)$$

From a review of the approximate signal of equation (9), it can be seen that the recorded data can be approximately resampled as follows:

$$\tilde{y}[n] = y\left(n\Delta t - \frac{\varepsilon'(n\Delta t)}{\gamma}\right) = \beta e^{j2\pi(f_0\tau - 0.5\gamma\tau^2)} e^{j2\pi\gamma\tau n\Delta t} \quad (11)$$

to provide a compensated signal. After generating an estimate of ε'(t), nonlinearity estimator 225 can provide the estimate of ε'(t) to nonlinearity compensator 224 at a number of discrete times. Nonlinearity compensator 224 can provide ε'(t) at times nΔt to an interpolator 228 of nonlinearity compensator 224 to generate a new set of data signals {ỹ[n]}, where each value of the new set at n is equal to a value for the output from ADC 212 at a time shifted based on ε'(t). The time shift can be provided as nΔt-ε'(nΔt)/γ as in equation (11). An example of a resampling step can be implemented using an interpolation technique, which may be a linear interpolation. Consider the following. Let y[0], y[1], . . . , y[N-1] be the raw samples, which are sampled from a continuous signal y(t) at time 0, Δt, 2*Δt, . . . , (N-1)*Δt, where * is the multiplication operator. Assume that the value of the sample at time 3.7*Δt is to be determined. Using a linear interpolation technology, this value of the samples can be computed as y[3]*0.3+y[4]*0.7 approximately. Similarly, other samples at any time between 0 and (N-1)*Δt can be computed. Other interpolation technologies, such as cubic, spline, etc., can be used. The resampling procedure can result in the nonlinear term ε'(t) effectively being cancelled such that the resampling step effectively eliminates the phase shift due to the nonlinearity.

FIGS. 4A-4D illustrate sequencing of a compensation of a received return signal associated with FIGS. 3A-3B from mixer output to a resampled sequence. FIG. 4A shows output from a mixer, such as mixer 207 of FIGS. 3A-3B, for the ideal case in curve 430 with respect to the non-ideal case in curve 435. FIG. 4B shows an output from an ADC, such as ADC 212 of FIGS. 3A-3B, with data points 440 projected on the analog signal. FIG. 4C shows resampled data points 445 with respect to the data points 440 of FIG. 4B. For times $$n\Delta t - \frac{\varepsilon'(n\Delta t)}{\gamma}, \quad y\left(n\Delta t - \frac{\varepsilon'(n\Delta t)}{\gamma}\right)$$

can be assigned a value from the original data interpolated from the magnitudes of the data at the sampled times immediately before and immediately after $$n\Delta t - \frac{\varepsilon'(n\Delta t)}{\gamma}.$$

This interpolation is shown in FIG. 4C. Other techniques may be used to provide the resampled data points. FIG. 4D shows the resampled sequence without the original data points.

Figure 5:
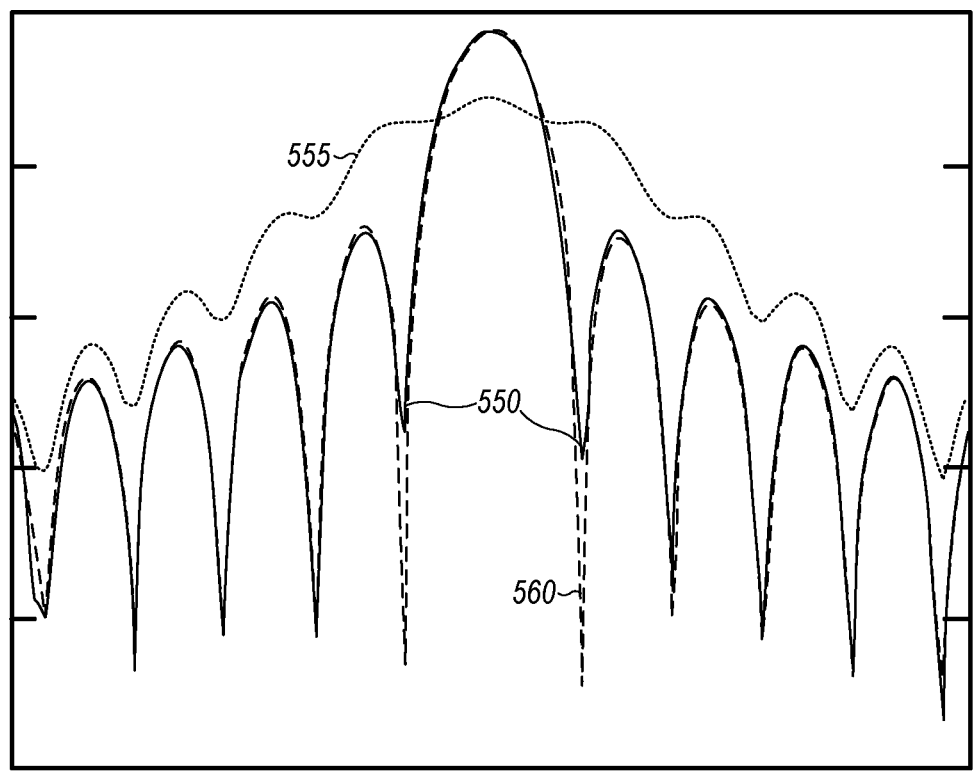
FIG. 5 shows a simulation of a received signal for an ideal case, a non-ideal case, and a case with compensation, according to an example embodiment.

FIG. 5 shows a simulation of a received return signal for an ideal case, a non-ideal case, a case with compensation. Curve 550 is a representation of the ideal case, which provides an ideal waveform with a narrow main lobe and low side lobes. Curve 555 is a representation of the non-ideal case with nonlinearity and no calibration/compensation of the received signal. Curve 555 shows a wider main lobe and higher side lobes than the ideal case of curve 550, which indicates poor detection and estimation performance. Curve 560 is a representation of a resampled sequence, as taught herein, used to provide a corresponding analog curve. Curve 560 shows that a system implementing the compensation technique, associated with FIGS. 3A-3B, can provide a performance similar to the ideal case reflected in curve 550.

Figure 6:
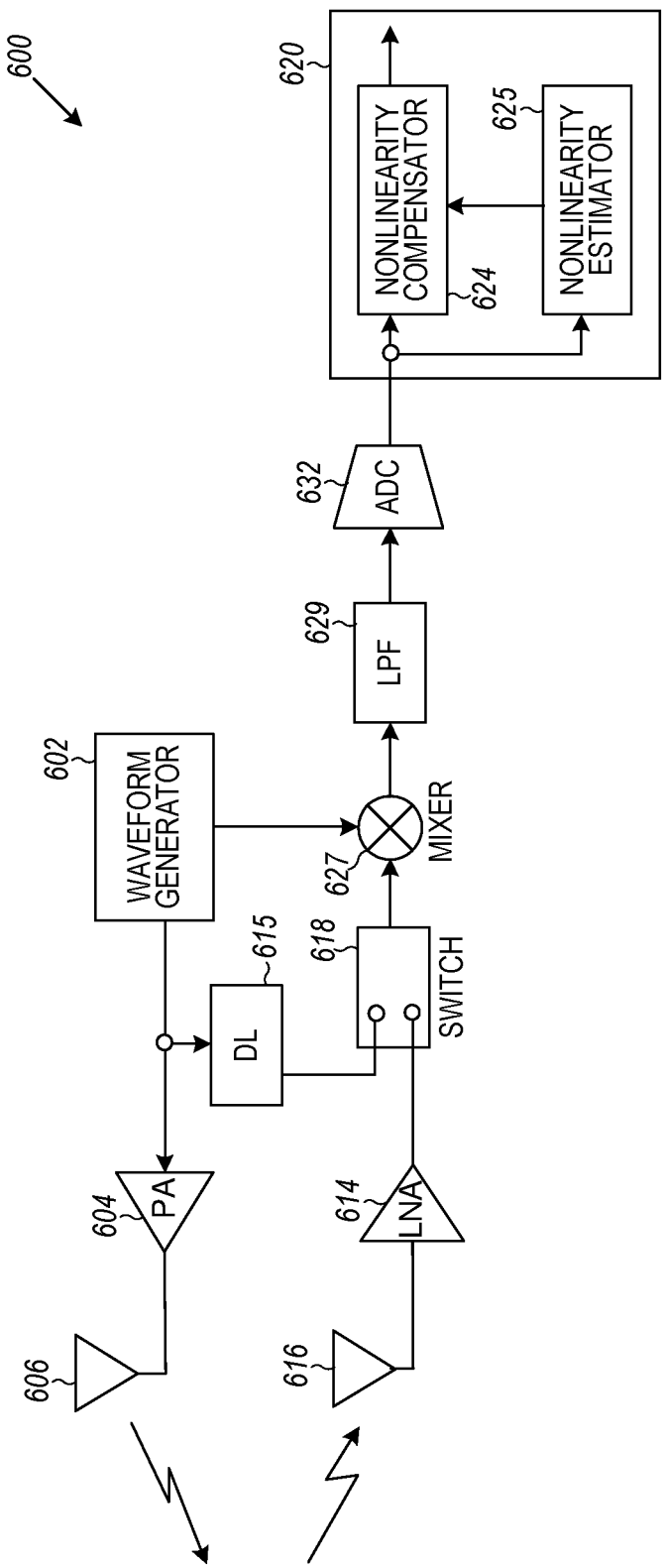
FIG. 6 shows an alternative example system similar to the system of FIG. 2, according to an example embodiment.

FIG. 6 shows an alternative embodiment of an example system 600 similar to system 200 of FIG. 2, but using only one mixer 627 in combination with a switch 618. In addition, the number of LPFs and ADCs used can be reduced. System 600 has low complexity and can provide off-line calibration. The off-line calibration is calibration that can be conducted while system 600 is not using its FWCW radar. This off-line calibration in this example arrangement of system 600 is provided by switch 618.

System 600 can include a waveform generator 602, a PA 604, and a transmitting antenna 606 in combination with receiving antenna 616, LNA 614, mixer 627, LPF 629, and an ADC 632 to operate as a FMCW radar. Switch 618 has an input coupled to a delay generator 615, an input coupled to a path to receiving antenna 616, and output coupled to mixer 627 such that with the switch operatively coupling delay generator 615 to mixer 627, system 600 is arranged to operate in a calibration mode. In calibration mode, switch 618 is set to provide output of DL 615 in line with the components to provide a signal to a nonlinearity estimator 625 of a processing module 620 to run a nonlinearity calibration. With switch 618 operatively coupling the path to receiving antenna 616 to mixer 627, system 600 is arranged to operate in a compensation mode, which can also be referred to as an operation mode. In the compensation mode, switch 618 can be set to the output of LNA 614, taking DL 615 off-line, to run nonlinearity compensation.

ADC 632 can be arranged in system 600 to process the mixer output signal into a digital received return signal as a processed received return signal in compensation mode and to provide the mixer output signal to estimate a nonlinearity for calibration. The mixer output provided to ADC 632 can be first processed by LPF 629. ADC 632 can provide the mixer output signal to the nonlinearity estimator 625 of processing module 620 as a digital signal to estimate a nonlinearity for calibration. ADC 632 can provide the mixer output signal to the nonlinearity compensator 624 of processing module 620 as a digital signal to compensate the return signal received at receiving antenna 616. Processing module 620 can provide the output from ADC 632 to nonlinearity compensator 624 or to nonlinearity estimator 625 depending on whether system 600 is in a compensation mode or in calibration mode, respectively. A switch in processing module 620 (not shown), operating in conjunction with switch 618, may be used to provide the appropriate digital signals to nonlinearity compensator 624 and nonlinearity estimator 625.

The circuitry of nonlinearity compensator 624 and nonlinearity estimator 625 can process the data from the received return signal and calibration data in a manner similar or identical to operation of nonlinearity compensator 224 and nonlinearity estimator 225 of system 200 of FIG. 2. The compensated data from system 600 or system 200 can be used in a variety of systems that use FMCW radar. Such compensating systems can be used in, but are not limited to, automotive radar, gesture recognition, vital sign monitoring, and in other radar-based applications. For example, compensating systems similar to or identical to compensating systems, as taught herein, can be used in automobiles, smart phones, smart watches, and other terminal devices.

Figure 7:
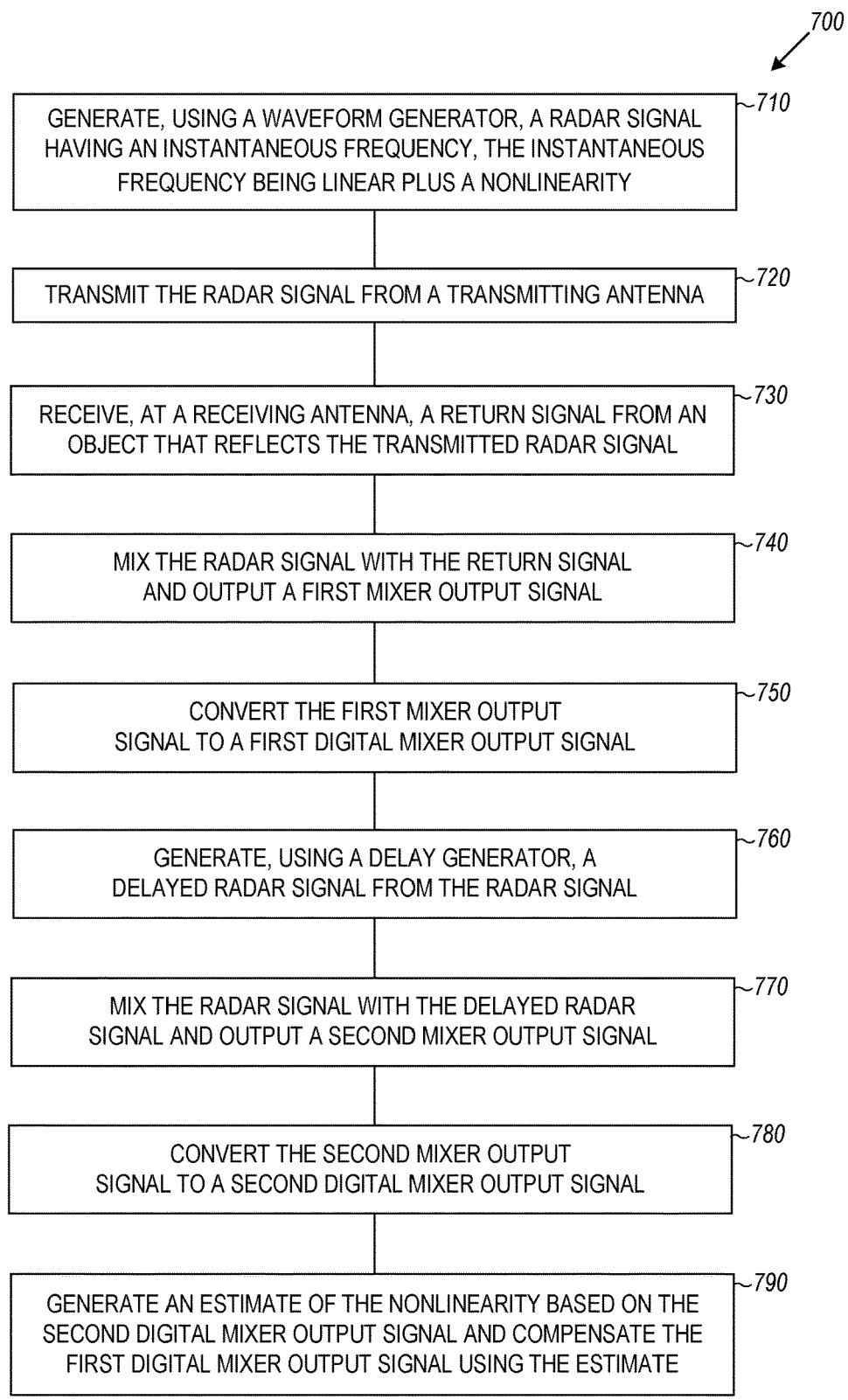
FIG. 7 is a flow diagram of features of an example method of operating a system having a frequency-modulated continuous wave radar, according to an example embodiment.

FIG. 7 is a flow diagram of features of an embodiment of an example method 700 of operating a system having a FMCW radar. At 710, a radar signal is generated using a waveform generator. The radar signal can have an instantaneous frequency that is linear plus a nonlinearity. The nonlinearity may be an artifact of a linear sweep generator, used as the waveform generator, which does not provide a perfectly linear instantaneous frequency. At 720, the radar signal is transmit from a transmitting antenna. The radar signal may be an amplified radar signal. At 730, a return signal from an object that reflects the transmitted radar signal is received at a receiving antenna.

At 740, the radar signal is mixed with the return signal and a first mixer output signal is output. The mixing may be performed using one of a number of mixers or may be performed by a mixer in conjunction with a switch such that the mixer can mix different sets of signals. At 750, the first mixer output signal is converted to a first digital mixer output signal. At 760, a delayed radar signal generated from the radar signal using a delay generator. At 770, the radar signal is mixed with the delayed radar signal and a second mixer output signal is output. At 780, the second mixer output signal converted to a second digital mixer output signal.

At 790, an estimate of the nonlinearity is generated based on the second digital mixer output signal and the first digital mixer output signal is compensated using the estimate. Generating the estimate of the nonlinearity can include estimating the nonlinearity as a function of time based on phase of the second digital mixer output signal, center frequency of the radar signal, chirp rate of the radar signal, and delay of the delayed radar signal. Compensating the first digital mixer output signal can include recording the first digital mixer output signal and resampling the first digital mixer output signal at an adjusted time using the estimate. Resampling the first digital mixer output signal can include interpolating the first digital mixer output signal at sampled times immediately before and immediately after the adjusted time.

Variations of method 700 or methods similar to method 700 can include a number of different embodiments that may or may not be combined depending on the application of such methods and/or the architecture of systems in which such methods are implemented. Such methods can include operating a switch with a mixer that provides the first mixer output signal and the second mixer output signal in a calibration mode or in a compensation mode. The calibration mode can be executed with the switch operatively coupling the delay generator to the mixer, and the compensation mode can be executed with the switch operatively coupling the mixer to the receiving antenna.

Variations of method 700 or methods similar to method 700 can include applying a fast Fourier transform to compensated first digital mixer output signal to detect the object and to estimate a delay associated with transmitting the radar signal and receiving the return signal. Such methods can include using the compensated first digital mixer output signal to determine one or more characteristics for the object from a set including distance, velocity, and direction associated with the object. Such methods can include operating the frequency-modulated continuous wave radar in an automobile or a terminal device. Method 700 can be implemented in different order of executing steps of method 700 and may be implemented in system 200 of FIG. 2, system 600 of FIG. 6, or similar systems.

Figure 8:
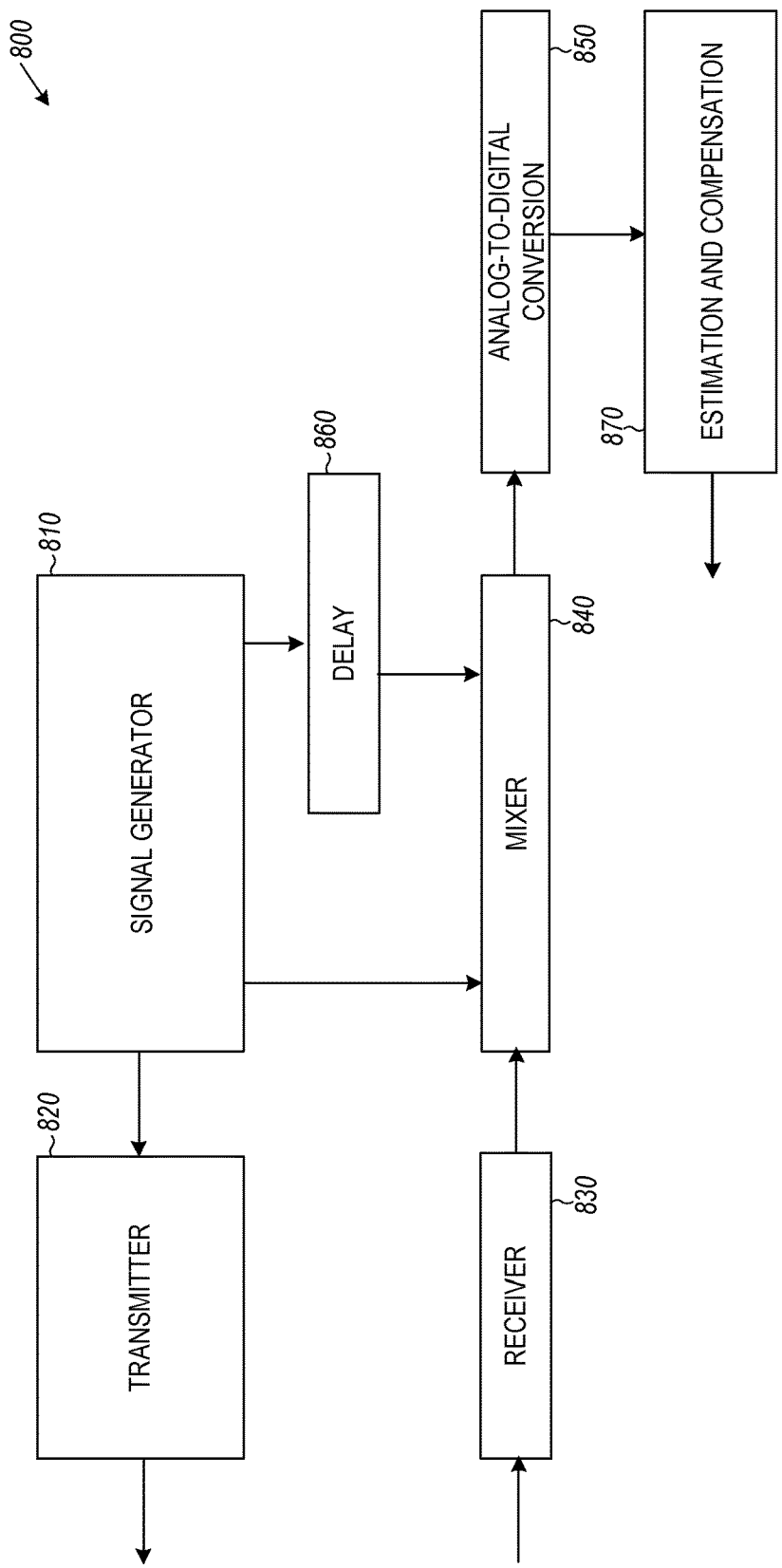
FIG. 8 is a block diagram of features of an example system having a frequency-modulated continuous wave radar with nonlinearity estimator and nonlinearity compensation calibration, according to an example embodiment.

FIG. 8 is a block diagram of an embodiment of an example system 800 having a FMCW radar. System 800 includes a signal generator means 810 having an instantaneous frequency, where the instantaneous frequency is linear plus a nonlinearity. The nonlinearity may be an artifact of a linear frequency sweep that does not provide a perfectly linear instantaneous frequency. Signal generator means 810 provides the radar signal to a transmitter means 820 to transmit the radar signal. The radar signal provided to transmitter means 820 may be an amplified radar signal. The transmitted radar signal may be reflected from an object, providing a return signal. The return signal from an object that reflects the transmitted radar signal can be received at receiver means 830.

The radar signal can be provided to a mixer means 840 from signal generator means 810 and the return signal can provided to mixer means 840 from receiver means 830. The return signal may be provided to mixer 840 as an amplified return signal. Mixer means 840 can mix the radar signal from signal generator means 810 with the return signal from the receiver means 830 and output a first mixer output signal. The first mixer output signal can be provided to an analog-to-digital conversion means 850 to convert the first mixer output signal to a first digital mixer output signal.

The radar signal can be provided to a delay means 860 from signal generator means 810, where delay means 860 generates a delayed radar signal from the radar signal. Delay means 860 provides the delayed radar signal to mixer means 840, where mixer means 840 mixes the radar signal form signal generator means 810 with the delayed radar signal and outputs a second mixer output signal. Mixer means 840 may be realized as a number of mixing means or a combination of a switching means and mixing means to generate the first mixer output signal and the second mixer output signal. The second mixer output signal can be provided to analog-to-digital conversion means 850 to convert the second mixer output signal to a second digital mixer output signal. Analog-to-digital conversion means 850 may be realized as a number of analog-to-digital converting means or a single analog-to-digital converting means used with a switching means, which switching means may be associated with the mixer means or with a separate switching means. The first mixer output signal and the second mixer output signal may be provided by one or more low pass filtering means.

The first digital mixer output signal and the second digital mixer output signal can be provided from analog-to-digital conversion means 850 to an estimation and compensation means 870. Estimation and compensation means 870 can estimate the nonlinearity in the generation of the radar signal by signal generator means 810, based on the second digital mixer output signal, and can compensate the first digital mixer output signal using the estimate. The compensated first digital mixer output signal can be provided by estimation and compensation means 870 for further processing of the return radar signal.

Figure 9:
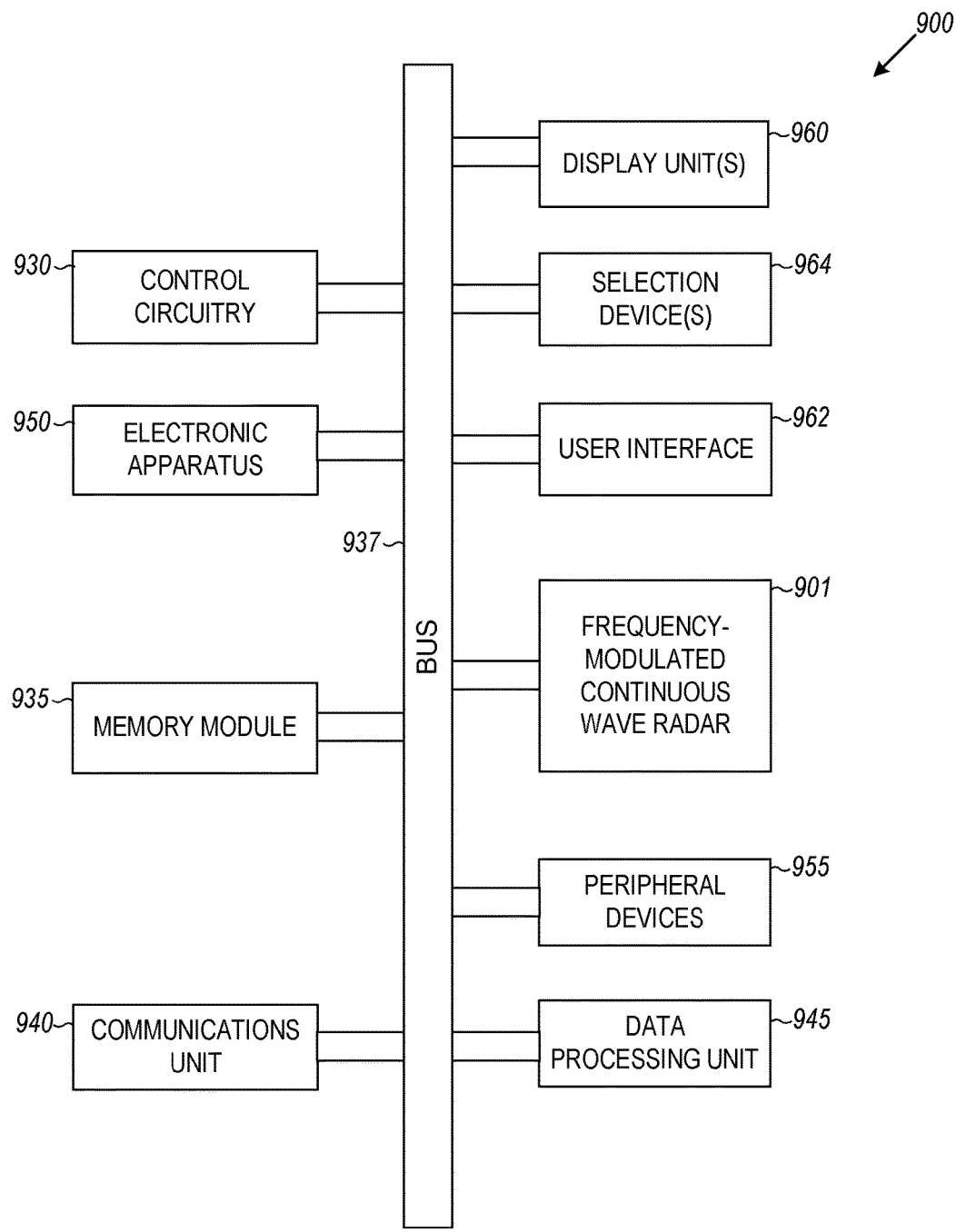
FIG. 9 is a block diagram of features of an example system having a frequency-modulated continuous wave radar with frequency nonlinearity calibration of the frequency-modulated continuous wave radar, according to an example embodiment.

FIG. 9 is a block diagram of features of an embodiment of an example system 900 having a FMCW radar 901 with frequency nonlinearity calibration of FMCW radar 901 as taught herein. FMCW radar 901 can include components as shown in FIGS. 2 and 6 may include features discussed with respect to FIGS. 1-8. System 900 may be integrated into an automobile, a smart phone, a smart watch, other terminal device, and other devices that have functions including short range radar applications.

System 900 may also include, in addition to FMCW radar 901, a number of components such as a control circuitry 930, memory module 935, communications unit 940, data processing unit 945, electronic apparatus 950, peripheral devices 955, display unit(s) 960, user interface 962, and selection device(s) 964. A number of these components can be realized in a common integrated circuit. These components may be structured in a set of integrated circuit.

Control circuitry 930 can be realized as one more ASICs. Control circuitry 930 may be structured to provide, among other things, adjustment to gain levels and other variable parameters of the circuitry of FMCW radar 901 and can be part of estimation and compensation circuitry of FMCW radar 901. Depending on the architecture and designed functions of system 900, control circuitry 930 can be realized as one or more processors, where such processors may operate as a single processor or a group of processors. Processors of the group of processors may operate independently depending on an assigned function. In controlling operation of the components of system 900 to execute schemes associated the functions for which system 900 is designed, control circuitry 930 can direct access of data to and from a database.

System 900 can include control circuitry 930, memory module 935, and communications unit 940 arranged to operate as a processing unit to control management of FMCW radar 901 and to perform operations on data signals collected by FMCW radar 901. For example, control circuitry 930, memory module 935, and communications unit 940 can be arranged to determine one or more characteristics for an object detected by FMCW radar 901 from a set including distance, velocity, and direction associated with the object and provide the data to display unit(s) 960, memory module 935, and/or to systems external to system 900 via communications unit 940. Depending on the application, communications unit 940 may use combinations of wired communication technologies and wireless technologies Memory module 935 can include a database having information and other data such that system 900 can operate on data to perform functions of system 900. Data processing unit 945 may be distributed among the components of system 900 including memory module 935 and/or electronic apparatus 950.

System 900 can also include a bus 937, where bus 937 provides electrical conductivity among the components of system 900. Bus 937 may include conductive traces in an integrated circuit in which a number of components of system 900 are located. Bus 937 may include an address bus, a data bus, and a control bus, where each may be independently configured. Bus 937 may be realized using a number of different communication mediums that allows for the distribution of components of system 900. Use of bus 937 can be regulated by control circuitry 930. Bus 937 may be operable as part of a communications network to transmit and receive signals including data signals and command and control signals.

In various embodiments, peripheral devices 955 may include drivers to provide voltage and/or current input to FMCW radar 901, additional storage memory and/or other control devices that may operate in conjunction with control circuitry 930 and/or memory module 935. Display unit(s) 960 can be arranged with a screen display that can be used with instructions stored in memory module 935 to implement user interface 962 to manage the operation of FMCW radar 901 and/or components distributed within system 900. Such a user interface can be operated in conjunction with communications unit 940 and bus 937. Display unit(s) 960 can include a video screen or other structure to visually project data/information and images. System 900 can include a number of selection devices 964 operable with user interface 962 to provide user inputs to operate data processing unit 945 or its equivalent. Selection device(s) 964 can include a touch screen or a selecting device operable with user interface 962 to provide user inputs to operate data processing unit 945 or other components of system 900.

In various embodiments, a system can include a set of processors and a set of associated non-transitory machine-readable storage devices to perform tasks for which the system is structured. The system may include a FMCW radar that can be operated, using the set of processors along with instructions stored in the set of non-transitory machine-readable storage devices, including compensating a processed return radar signal for nonlinearity in the generation of the radar signal by a waveform generator, as taught herein. Such set of non-transitory machine-readable storage devices can comprise instructions stored thereon, which, when performed by a machine, cause the machine to perform operations, the operations comprising one or more features similar to or identical to features of methods and techniques described with respect to method 700, variations thereof, and/or features of other methods taught herein such as associated with FIGS. 1-9. The physical structures of such instructions may be operated on by one or more processors. For example, executing these physical structures can cause the machine to perform operations comprising: generating, using a waveform generator, a radar signal having an instantaneous frequency, the instantaneous frequency being linear plus a nonlinearity; transmitting the radar signal from a transmitting antenna; receiving, at a receiving antenna, a return signal from an object that reflects the transmitted radar signal; mixing the radar signal with the return signal and outputting a first mixer output signal; converting the first mixer output signal to a first digital mixer output signal; generating, using a delay generator, a delayed radar signal from the radar signal; mixing the radar signal with the delayed radar signal and outputting a second mixer output signal; converting the second mixer output signal to a second digital mixer output signal; and generating an estimate of the nonlinearity based on the second digital mixer output signal and compensating the first digital mixer output signal using the estimate.

A number of operations can be controlled via the set of processors and the set of non-transitory machine-readable storage devices. Operations can include generating the estimate of the nonlinearity to include estimating the nonlinearity as a function of time based on phase of the second digital mixer output signal, center frequency of the radar signal, chirp rate of the radar signal, and delay of the delayed radar signal. Compensating the first digital mixer output signal can include recording the first digital mixer output signal and resampling the first digital mixer output signal at an adjusted time using the estimate. Resampling the first digital mixer output signal can include interpolating the first digital mixer output signal at sampled times immediately before and immediately after the adjusted time. Operations can include operating a switch with a mixer that provides the first mixer output signal and the second mixer output signal in a calibration mode or in a compensation mode such that the calibration mode is executed with the switch operatively coupling the delay generator to the mixer, and the compensation mode is executed with the switch operatively coupling the mixer to the receiving antenna.

Operations can include applying a fast Fourier transform to compensated first digital mixer output signal to detect the object and to estimate a delay associated with transmitting the radar signal and receiving the return signal. Operations can include using the compensated first digital mixer output signal to determine one or more characteristics for the object from a set including distance, velocity, and direction associated with the object.

Further, a machine-readable storage device, herein, is a physical device that stores data represented by physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices. The machine-readable device may be a machine-readable medium such as memory module 935 of FIG. 9. While memory module 935 is shown as a single unit, terms such as "memory," "memory module," "machine-readable medium," "machine-readable device," and similar terms should be taken to include all forms of storage media, either in the form of a single medium (or device) or multiple media (or devices), in all forms. For example, such structures can be realized as centralized database(s), distributed database(s), associated caches, and servers; one or more storage devices, such as storage drives (including but not limited to electronic, magnetic, and optical drives and storage mechanisms), and one or more instances of memory devices or modules (whether main memory; cache storage, either internal or external to a processor; or buffers). Terms such as "memory," "memory module," "machine-readable medium," and "machine-readable device," shall be taken to include any tangible non-transitory medium which is capable of storing or encoding a sequence of instructions for execution by the machine and that cause the machine to perform any one of the methodologies taught herein. The term "non-transitory" used in reference to a "machine-readable device," "medium," "storage medium," "device," or "storage device" expressly includes all forms of storage drives (optical, magnetic, electrical, etc.) and all forms of memory devices (e.g., DRAM, Flash (of all storage designs), SRAM, MRAM, phase change, etc., as well as all other structures designed to store data of any type for later retrieval.

As noted, the machine-readable non-transitory media, such as computer-readable non-transitory media, includes all types of computer readable media, including magnetic storage media, optical storage media, flash media and solid state storage media. It should be understood that software can be installed in and sold with a device having a FMCW radar. Alternatively the software can be obtained and loaded into the device having a FMCW radar, including obtaining the software through physical medium or distribution system, including, for example, from a server owned by the software creator or from a server not owned but used by the software creator. The software can be stored on a server for distribution over the Internet, for example. Execution of various instructions may be realized by the control circuitry of the machine to execute one or more features similar to or identical to features of methods and techniques described with respect to method 700, variations thereof, and/or features of other methods taught herein such as associated with FIGS. 1-8. For example, the instructions can include instructions to operate a FMCW radar as part of other systems in accordance with the teachings herein. Control circuitry for operation of the FMCW radar as part of other systems can include one or more ASICs.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A system having a frequency-modulated continuous wave radar, the system comprising:
    a waveform generator to generate a radar signal having an instantaneous frequency, the instantaneous frequency being linear plus a nonlinearity;
    a transmitting antenna to transmit the radar signal;
    a receiving antenna to receive a return signal from an object that reflects the transmitted radar signal;
    a first mixer to mix the radar signal with the return signal and to output a first mixer output signal;
    a first analog-to-digital converter to convert the first mixer output signal to a first digital mixer output signal;
    a delay generator coupled to the waveform generator to generate a delayed radar signal;
    a second mixer to mix the radar signal with the delayed radar signal and to output a second mixer output signal;
    a second analog-to-digital converter to convert the second mixer output signal to a second digital mixer output signal; and
    circuitry to generate an estimate of the nonlinearity based on the second digital mixer output signal and to compensate the first digital mixer output signal by use of the estimate.

2. The system of claim 1, wherein the circuitry is arranged to generate the estimate as a function of time based on phase of the second digital mixer output signal, center frequency of the radar signal, chirp rate of the radar signal, and delay of the delayed radar signal.

3. The system of claim 1, wherein the circuitry is arranged to record the first digital mixer output signal and to resample the first digital mixer output signal at an adjusted time using the estimate.

4. The system of claim 3, wherein the circuitry to resample includes an interpolation of the first digital mixer output signal at sampled times immediately before and immediately after the adjusted time.

5. The system of claim 1, wherein a delay of the delay generator to generate a delayed radar signal is in the range from 100 picoseconds to 10 nanoseconds.

6. The system of claim 1, wherein the system includes a first low pass filter coupling the first mixer to the first analog-to-digital converter and a second low pass filter coupling the second mixer to the second analog-to-digital converter.

7. A system having a frequency-modulated continuous wave radar, the system comprising:
    a waveform generator to generate a radar signal having an instantaneous frequency, the instantaneous frequency being linear plus a nonlinearity;
    a transmitting antenna to transmit the radar signal;
    a receiving antenna to receive a return signal from an object that reflects the transmitted radar signal;
    a delay generator coupled to the waveform generator to generate a delayed radar signal;
    a mixer coupled to the waveform generator to receive the radar signal;
    a switch having an input coupled to the delay generator, an input coupled to a path to the receiving antenna, and an output coupled to the mixer such that with the switch operatively coupling the receiving antenna to the mixer, an output of the mixer provides a first mixer output signal from mixing the radar signal with the return signal, and with the switch operatively coupling the delay generator to the mixer, an output of the mixer provides a second mixer output signal from mixing the radar signal with the delayed radar signal;
    an analog-to-digital converter coupled to the mixer to convert the first mixer output signal to a first digital mixer output signal and to convert the second mixer output signal to a second digital mixer output signal; and
    circuitry to generate an estimate of the nonlinearity based on the second digital mixer output signal and to compensate the first digital mixer output signal by use of the estimate.

8. The system of claim 7, wherein the circuitry is arranged to generate the estimate as a function of time based on phase of the second digital mixer output signal, center frequency of the radar signal, chirp rate of the radar signal, and delay of the delayed radar signal.

9. The system of claim 7, wherein the circuitry is arranged to record the first digital mixer output signal and to resample the first digital mixer output signal at an adjusted time using the estimate.

10. The system of claim 7, wherein the circuitry to resample includes an interpolation of the first digital mixer output signal at sampled times immediately before and immediately after the adjusted time.

11. The system of claim 7, wherein delay of the delay generator to generate a delayed radar signal is in the range from 100 picoseconds to 10 nanoseconds.

12. The system of claim 7, wherein the system includes a low pass filter coupling the mixer to the analog-to-digital converter.

13. A method of operating a frequency-modulated continuous wave radar, the method comprising:
    generating, using a waveform generator, a radar signal having an instantaneous frequency, the instantaneous frequency being linear plus a nonlinearity;
    transmitting the radar signal from a transmitting antenna;
    receiving, at a receiving antenna, a return signal from an object that reflects the transmitted radar signal;
    mixing the radar signal with the return signal and outputting a first mixer output signal;
    converting the first mixer output signal to a first digital mixer output signal;
    generating, using a delay generator, a delayed radar signal from the radar signal;
    mixing the radar signal with the delayed radar signal and outputting a second mixer output signal;
    converting the second mixer output signal to a second digital mixer output signal; and generating an estimate of the nonlinearity based on the second digital mixer output signal and compensating the first digital mixer output signal using the estimate.

14. The method of claim 13, wherein generating the estimate of the nonlinearity includes estimating the nonlinearity as a function of time based on phase of the second digital mixer output signal, center frequency of the radar signal, chirp rate of the radar signal, and delay of the delayed radar signal.

15. The method of claim 13, wherein compensating the first digital mixer output signal includes recording the first digital mixer output signal and resampling the first digital mixer output signal at an adjusted time using the estimate.

16. The method of claim 15, wherein resampling the first digital mixer output signal includes interpolating the first digital mixer output signal at sampled times immediately before and immediately after the adjusted time.

17. The method of claim 13, wherein the method includes operating a switch with a mixer that provides the first mixer output signal and the second mixer output signal in a calibration mode or in a compensation mode such that the calibration mode is executed with the switch operatively coupling the delay generator to the mixer, and the compensation mode is executed with the switch operatively coupling the mixer to the receiving antenna.

18. The method of claim 13, wherein the method includes applying a fast Fourier transform to the compensated first digital mixer output signal to detect the object and to estimate a delay associated with transmitting the radar signal and receiving the return signal.

19. The method of claim 13, wherein includes using the compensated first digital mixer output signal to determine one or more characteristics for the object from a set including distance, velocity, and direction associated with the object.

20. The method of claim 13, wherein the method includes operating the frequency-modulated continuous wave radar in an automobile or a terminal device.

\* \* \* \* \*